US011173609B2

(12) United States Patent
Lee et al.

(10) Patent No.: US 11,173,609 B2
(45) Date of Patent: Nov. 16, 2021

(54) HAND-EYE CALIBRATION METHOD AND SYSTEM

(71) Applicant: Samsung Electronics Co., Ltd., Gyeonggi-do (KR)

(72) Inventors: Sohee Lee, Gyeonggi-do (KR); Sukjune Yoon, Gyeonggi-do (KR); Yuso Kang, Gyeonggi-do (KR); Kyungshik Roh, Gyeonggi-do (KR); Wook Bahn, Gyeonggi-do (KR); Minyong Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 135 days.

(21) Appl. No.: 16/743,678

(22) Filed: Jan. 15, 2020

(65) Prior Publication Data
US 2020/0230818 A1   Jul. 23, 2020

(30) Foreign Application Priority Data
Jan. 22, 2019   (KR) .......................... 10-2019-0008402

(51) Int. Cl.
*B25J 9/16*   (2006.01)
*B25J 9/02*   (2006.01)
(Continued)

(52) U.S. Cl.
CPC ............. *B25J 9/1692* (2013.01); *B25J 9/023* (2013.01); *B25J 9/161* (2013.01); *B25J 9/1674* (2013.01);
(Continued)

(58) Field of Classification Search
CPC ........ B25J 9/1692; B25J 9/1697; B25J 9/023; B25J 19/04; B25J 9/1674; B25J 13/08;
(Continued)

(56) References Cited

U.S. PATENT DOCUMENTS 5,297,238 A * 3/1994 Wang .................... B25J 9/1692
700/254
7,359,817 B2 * 4/2008 Ban ....................... B25J 9/1692
356/2

(Continued)

FOREIGN PATENT DOCUMENTS

| JP | 2015-089575 | 5/2015 |
| JP | 6301045 | 3/2018 |
| WO | WO 2018/163450 | 9/2018 |

OTHER PUBLICATIONS

Wu et al., Finding the Kinematic Base Frame of a Robot by Hand-Eye Calibration Using 3D Position Data, 2017, IEEE Transactions on Automation Science and Engineering, vol. 14, No. 1, Jan. 2017, pp. 314-324 (Year: 2017).*

(Continued)

*Primary Examiner* — Jaime Figueroa
(74) *Attorney, Agent, or Firm* — The Farrell Law Firm, P.C.

(57) ABSTRACT

A hand-eye calibration system and method are provided. The system includes a robot on which a small pattern is mounted, a camera configured to photograph the robot, a memory, and a processor configured to move the robot, acquire posture information of the moved robot, acquire an image from the camera, move the camera after performing the robot movement, the posture information acquisition, and the image acquisition a first predetermined number of times, and perform hand-eye calibration for the robot based on the posture information and the images, which are obtained by repeatedly performing of the robot movement, the posture information acquisition, the image acquisition, and the camera movement.

20 Claims, 9 Drawing Sheets

(51) Int. Cl.
  *B25J 13/08* (2006.01)
  *B25J 19/04* (2006.01)
(52) U.S. Cl.
  CPC ............. *B25J 9/1697* (2013.01); *B25J 13/08* (2013.01); *B25J 19/04* (2013.01)
(58) Field of Classification Search
  CPC ........ B25J 9/161; B25J 9/1682; B25J 9/0084; G05B 2219/39057; G05B 2219/39008; G05B 2219/39045
  USPC .................................................. 700/245–264
  See application file for complete search history.

(56) References Cited

U.S. PATENT DOCUMENTS

| | | | | |
|---|---|---|---|---|
| 9,188,973 | B2* | 11/2015 | Tenney | B25J 9/1697 |
| 9,393,694 | B2* | 7/2016 | Wallack | B25J 9/1697 |
| 9,457,470 | B2* | 10/2016 | Lundberg | B25J 9/1697 |
| 10,089,753 | B1* | 10/2018 | Fegyver | G06K 9/468 |
| 10,871,366 | B2* | 12/2020 | Nahum | G01B 5/008 |
| 10,913,156 | B2* | 2/2021 | Nahum | G05B 19/401 |
| 11,002,529 | B2* | 5/2021 | Nahum | B25J 11/005 |
| 11,014,233 | B2* | 5/2021 | Dan | B25J 9/1697 |
| 11,014,241 | B2* | 5/2021 | Islam | B25J 9/1692 |
| 2010/0194886 | A1* | 8/2010 | Asari | G06T 7/85 348/148 |
| 2011/0280472 | A1* | 11/2011 | Wallack | G06T 7/80 382/153 |
| 2015/0025683 | A1* | 1/2015 | Amano | B25J 9/1692 700/254 |
| 2015/0127153 | A1 | 5/2015 | Yamaguchi et al. | |
| 2015/0297177 | A1* | 10/2015 | Boctor | A61B 34/30 600/437 |
| 2016/0039094 | A1* | 2/2016 | Lundberg | B25J 9/1697 700/251 |
| 2016/0039096 | A1 | 2/2016 | Wallack et al. | |
| 2016/0239725 | A1* | 8/2016 | Liu | G06T 5/002 |
| 2017/0032537 | A1* | 2/2017 | Li | G06T 7/80 |
| 2018/0194008 | A1* | 7/2018 | Namiki | G06T 7/80 |
| 2020/0016758 | A1* | 1/2020 | Keller | B25J 9/1692 |

OTHER PUBLICATIONS

C. Chen and Y. F. Zheng, "A new robotic hand/eye calibration method by active viewing of a checkerboard pattern," [1993] Proceedings IEEE International Conference on Robotics and Automation, 1993, Atlanta, GA, USA, pp. 770-775 vol. 2, doi: 10.1109/ROBOT.1993.291941. (Year: 1993).*

* cited by examiner

HAND-EYE CALIBRATION METHOD AND SYSTEM

CROSS-REFERENCE TO RELATED APPLICATION(S)

This application is based on and claims priority under 35 U.S.C. § 119 to Korean Patent Application No. 10-2019-0008402, filed on Jan. 22, 2019, in the Korean Intellectual Property Office, the entire disclosure of which is incorporated herein by reference.

BACKGROUND

1. Field

The disclosure is generally related to a hand-eye calibration method and system.

2. Description of Related Art

Robots are often used in industrial applications instead of humans. For example, in a vehicle production line, multiple robots combined with tools suitable for each process may perform various operations on a vehicle. Therefore, using a production line that combines tools for multiple robots, large quantities of vehicles can be produced more efficiently. Further, because robots perform various processes according to designed values, maintaining process quality is easier with robots than with processes performed by humans.

Before performing processes using a robot, designed values for a position, a direction, and an operating type of a robot may be determined, and the determined designed value may be input to a computer to control the robot to perform each process according to the designed value.

However, because a manufacturing error of a robot, an operation error of the robot, and/or an installation error of a tool mounted on the robot may occur, a designed value of the robot may be determined in consideration of these errors. If various errors (or mistakes) are generated by a robot, defects in the products produced by the robot may occur. In order to prevent such product defects, a method for performing a robot calibration, and thus minimizing an error generated by a robot, is being used. Calibration may refer to predictions such that a position and a direction of a robot, parameters controlling kinematic equations of a robot, and an installation position and a direction of a tool are adjusted to be the same as those of an actual production line. The robot calibration can be performed before the robot is used for manufacturing a product.

In a conventional hand-eye calibration, a camera is positioned to capture images of the robot and a pattern is mounted on the robot in order to perform calibration. Alternatively, when the camera is mounted directly on the robot, calibration may be performed while the pattern is fixed to a specific external location.

In order to perform hand-eye calibration in a two-armed robot system by using the above method, an optimized geometric relationship between a robot and a pattern can be obtained by mounting a camera on both arms of the robot and moving a pattern fixed to the outside. However, if the robot base is fixed and the geometric relationship of both arms is known, the above method is inefficient and difficult to diagnose with simple motion while the robot is working.

SUMMARY

Accordingly, an aspect of the disclosure is to provide a method and system for performing hand-eye calibration, wherein a camera is mounted on one arm of a two-armed robot, and a small pattern, configured to have a smaller form than a checkerboard used for calibration, is mounted on the other arm, such that the hand-eye calibration is performed while moving positions of the camera and the robot on which the small pattern is mounted.

In accordance with an aspect of the disclosure, a hand-eye calibration system is provided, which includes a robot on which a small pattern is mounted; a camera configured to photograph the robot; a memory; and a processor configured to move the robot, acquire posture information of the moved robot, acquire an image from the camera, move the camera after performing the robot movement, the posture information acquisition, and the image acquisition a first predetermined number of times, and perform hand-eye calibration for the robot based on the posture information and the images, which are obtained by repeatedly performing of the robot movement, the posture information acquisition, the image acquisition, and the camera movement.

In accordance with another aspect of the disclosure, a method is provided for operating a hand-eye calibration system including a robot on which a small pattern is mounted and a camera configured to photograph the robot. The method includes moving the robot; acquiring posture information of the moved robot; acquiring an image from the camera; moving the camera after performing the robot movement, the posture information acquisition, and the image acquisition a first predetermined number of times; and performing hand-eye calibration for the robot based on the posture information and the image, which are obtained by repeating the robot movement, the posture information acquisition, the image acquisition, and the camera movement.

BRIEF DESCRIPTION OF THE DRAWINGS

The above and other aspects, features, and advantages of certain embodiments of the disclosure will be more apparent from the following detailed description, taken in conjunction with the accompanying drawings, in which.

DETAILED DESCRIPTION

Figure 1:
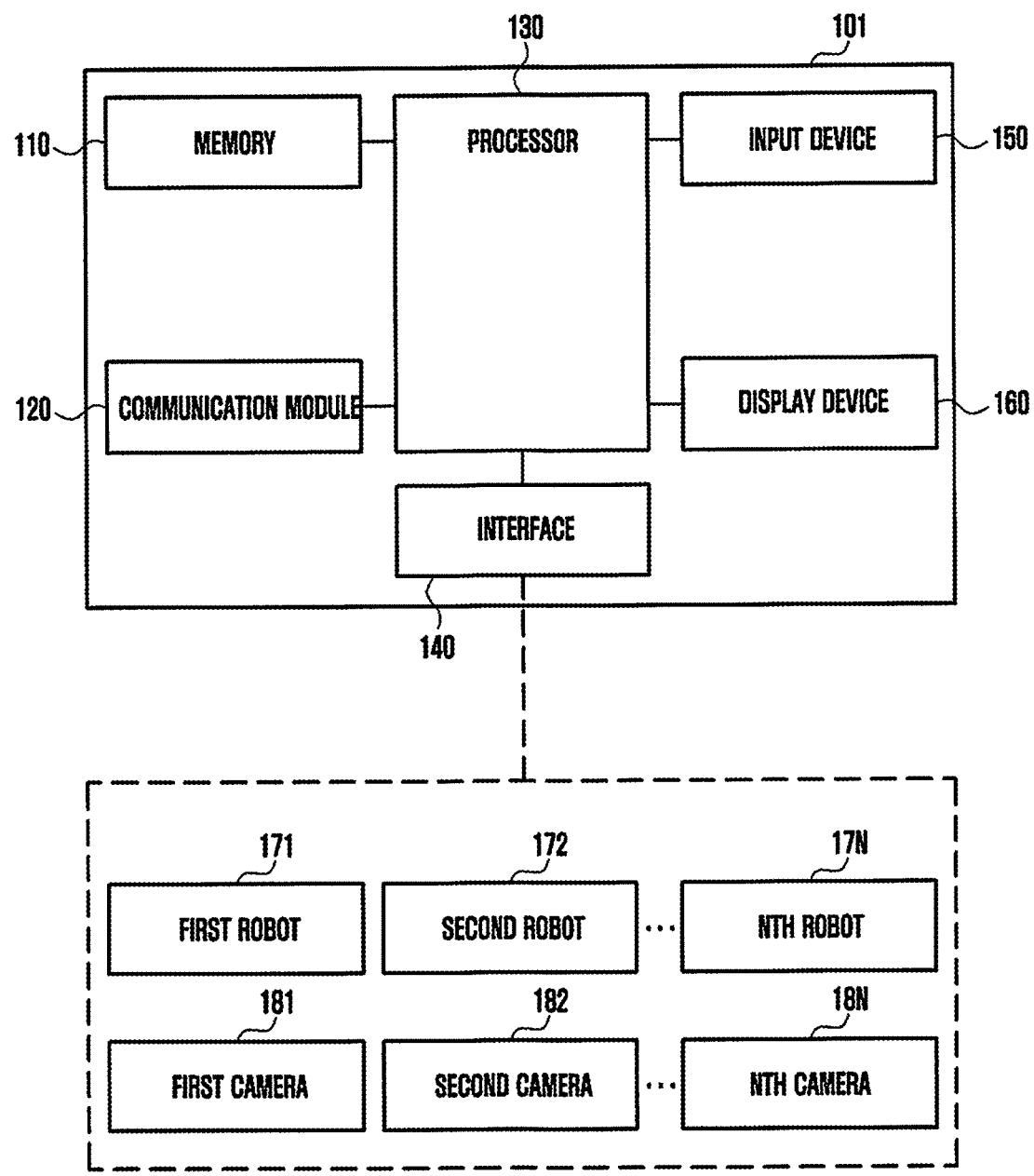
FIG. 1 illustrates a hand-eye calibration system according to an embodiment.

Various embodiments of the disclosure will be described in detail below with reference to the accompanying drawings. In the following description, specific details such as detailed configuration and components are merely provided to assist the overall understanding of these embodiments of the disclosure. Therefore, it should be apparent to those skilled in the art that various changes and modifications of the embodiments described herein can be made without departing from the scope and spirit of the disclosure. In addition, descriptions of well-known functions and constructions are omitted for clarity and conciseness.

Various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. Terms such as "$1^{st}$" and "$2^{nd}$", or "first and second" may be used to simply distinguish a corresponding component from another, and does not limit the components in other aspect (e.g., importance or order). If an element (e.g., a first element) is referred to, with or without the term "operatively" or "communicatively as coupled with, or connected with, it means that the element may be coupled with the other element directly (e.g., wiredly), wirelessly, or via a third element.

Herein, the term "module" may include a unit implemented in hardware, software, or firmware, and may be used interchangeably with other terms, for example, "logic," "logic block," "part," or "circuit". A module may be a single integral component, or a minimum unit or part thereof, adapted to perform one or more functions. For example, according to an embodiment, the module may be implemented in a form of an application-specific integrated circuit (ASIC).

Various embodiments disclosed herein may be implemented by software (e.g., a program) that includes one or more instructions stored in a machine-readable storage medium. For example, a processor of a device (e.g., a hand-eye calibration system) may call, from the storage medium, at least one instruction of one or more stored instructions, and execute the same. This allows the machine to be operated to perform at least one function according to the invoked at least one instruction. The one or more instructions may include a code generated by a complier or a code executable by an interpreter. The machine-readable storage medium may be provided in the form of a non-transitory storage medium. Herein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more components of the above-described components or operations may be omitted, or one or more other components or operations may be added. Alternatively or additionally, multiple components (e.g., modules or programs) may be integrated into a single component. In such a case, the integrated component may still perform one or more functions of each of the multiple components in the same or similar manner as they are performed by a corresponding one of the multiple components before the integration. Operations performed by the module, the program, or another component may be carried out sequentially, in parallel, repeatedly, or heuristically, or one or more of the operations may be executed in a different order or omitted, or one or more other operations may be added.

FIG. 1 illustrates a hand-eye calibration system according to an embodiment.

Referring to FIG. 1, a hand-eye calibration system 101 includes a memory 110, a communication module 120, a processor 130, an interface 140, an input device 150, and a display device 160. The hand-eye calibration system 101 is connected to multiple robots (a first robot 171 to an N-th robot 17N, where N is a natural number) and multiple cameras (a first camera 181 to an N-th camera 18N) through the interface 140. Alternatively, the hand-eye calibration system 101 may be connected to the multiple robots and the multiple cameras through the communication module 120.

The memory 110 may store various pieces of data used by at least one element (e.g., the processor 130) of the hand-eye calibration system 101. For example, the memory 110 may store a traveling direction within a checkerboard (e.g., a checkerboard for hand-eye calibration) and a configuration value (e.g., an X-axis configuration value and a Y-axis configuration value). The data may include software (e.g., a program) and input data or output data for instructions associated therewith. The memory 110 may include a volatile memory or a non-volatile memory. The program may be stored as software in the memory 110.

The communication module 120 may support establishing a direct (e.g., wired) communication channel or wireless communication channel between a hand-eye calibration system 101 and the multiple robots and the multiple cameras, and may support performing communication via the established communication channel. The communication module 120 may include one or more communication processors that are operable independently of the processor 130 (e.g., an application processor (AP)) and supports a direct communication or a wireless communication. The communication module. 100 may include a wireless communication module (e.g., a short range communication module) or a wired communication module. (e.g., a local area network (LAN) communication module or a power line communication module).

The processor 130 may execute software to control at least one other element (e.g., a hardware or software element) of the hand-eye calibration system 101 connected to the processor 130, and may perform various data processing or operations. As at least a part of data processing or calculation, the processor 130 may load instructions or data received from another element (e.g., the communication module 120) into the memory 110, perform processing of instructions or data stored in the memory 110, and store data obtained as a result of the processing in the memory 110.

The processor 130 may include a main processor (e.g., a central processing unit (CPU) or an AP), and a co-processor (e.g., a graphics processing unit (GPU), an image signal processor (ISP), a sensor hub processor, or a communication processor (CP)) that is operable independently of or together with the main processor.

The processor 130 may control a first robot 171, a second robot 172, and an N-th robot 17N. For example, the processor 130 may move the first robot 171, the second robot 172, and the N-th robot 17N based on a traveling direction within a checkerboard (or a calibration checkerboard) stored in the memory 110, and may acquire posture information of each of the moved robots. In addition, the processor 130 may acquire images captured by the multiple cameras 181 to 18N. For example, the processor 130 may repeatedly acquire posture information by moving the first robot 171 on a plane until the first robot 171 is moved to all positions (X-axis and Y-axis movements) within the checkerboard, and acquire an image captured by the first camera 181. The processor 130 may move the first robot 171 to all positions within the checkerboard, and then move a position of the first camera 181.

The processor 130 may use images captured at various angles in order to increase the hand-eye calibration performance. After moving the position of the first camera 181, the processor 130 may repeatedly acquire posture information and an image by moving the first robot 171 to all positions within the checkerboard. The processor 130 may move a position of the first camera 181 until the number of movements satisfies a predetermined number of times of movement (e.g., "M"). The processor 130 may acquire multiple images and multiple pieces of posture information corresponding to each robot by moving a position of a camera a predetermined number of times, and may perform hand-eye calibration using the acquired posture information and images.

The processor 130 may determine whether each robot has a fault after performing the hand-eye calibration. The processor 130 may monitor the first robot 171, the second robot 172, and the N-th robot 17N in order to diagnose each robot fault. The processor 130 may acquire images obtained by capturing the first robot 171, the second robot 172, and the N-th robot 17N from the first camera 181, the second camera 182, and the N-th camera 18N, respectively. The processor 130 may diagnose a robot fault by using a difference between first pattern coordinate system information obtained by using robot posture information and small pattern position information in the image, and second pattern coordinate system information obtained by using robot joint angle information. When a robot fault is diagnosed, the processor 130 may perform hand-eye calibration.

The hand-eye calibration system 101 may be physically connected to, through the interface 140, the multiple robots 171 to 17N and the multiple cameras 181 to 18N. A pattern (or shape) of the interface 140 may be variously configured.

The input device 150 may receive, from the outside (e.g., from a user) the hand-eye calibration system 101, a command or data to be used for an element (e.g., the processor 130) of the hand-eye calibration system 101. The input device 150 may include a microphone, a mouse, a keyboard, a digital pen (e.g., a stylus pen), etc.

The display device 160 may visually provide information to the outside the hand-eye calibration system 101. The display device 160 may include a display, a hologram device, and/or a projector, and a control circuit for controlling a corresponding device.

End-effectors may be mounted on the first robot 171, the second robot 172, and the N-th robot 17N. The first robot 171, the second robot 172, and the N-th robot 17N on which the end effectors are mounted may be mounted with a small pattern for calibration. The small pattern may be configured in the form of a smaller checkerboard than is used for hand-eye calibration (hereinafter, referred to as a checkerboard). For example, the checkerboard may be configured in a 10×10 matrix, and the small pattern may be configured in a 2×2 matrix format. That is, the checkerboard may be larger than the size of the small pattern. Although the small pattern will be described as being a 2×2 matrix herein, this is merely an example and the small pattern is not limited to this example.

Squares included in a same column or row in the 2×2 matrix may be configured in different colors, and squares diagonally opposite each other may be configured in the same color. For example, the (1,1), (2,2) squares may be configured in a dark color (e.g., black), and the (1,2), (2,1) squares may be configured in a bright color (e.g., white). The first robot 171, the second robot 172, and the N-th robot 17N may control at least one of a position, a direction, or a moving pattern under the control of the processor 130. The first robot 171, the second robot 172, and the N-th robot 17N may move on a plane under the control of the processor 130, e.g., may move in a first direction (X-axis (left/right), horizontal direction) or a second direction (Y-axis (up/down), vertical direction). Herein, a robot on which a small pattern is mounted may be referred to as a "small pattern robot".

The first camera 181, the second camera 182, and the N-th camera 18N may be installed corresponding to the first robot 171, the second robot 172, and the N-th robot 17N, respectively. That is, the first camera 181 is installed to photograph the first robot 171, the second camera 182 is installed to photograph the second robot 172, and the N-th camera 18N is installed to photograph the N-th robot 17N. The first camera 181 may be installed to photograph a small pattern mounted on the first robot 171. The first camera 181 may photograph a small pattern mounted on the first robot 171 while moving according to the movement of the first robot 171, and may transmit the captured image to the processor 130. The first camera 181 may acquire an image each time the first robot 171 moves to a position within the checkerboard. After the first robot 171 moves to all of the positions within the checkerboard, the position of the first camera 181 may be moved according to the control of the processor 130. The first camera 181 may capture an image of a small pattern mounted on the first robot 171 while moving a position a predetermined number of times (e.g., M), and may transmit the captured image to the processor 130. The first camera 181 may acquire images corresponding to movements (e.g., n*m*M), which include n times of movements of the first robot 171 along the X-axis, m times movements of the first robot 171 along the Y-axis, and M times of movements of the position of the first camera 181.

When the first robot 171 is a two-armed robot, the first camera 181 may be mounted on one arm of the two-armed robot, and a small pattern may be mounted on the other arm of the two-armed robot. For a two-armed robot, an end effector may also be mounted on one arm mounted with the camera.

When the first robot 171 is a single-armed robot, the first camera 181 may be mounted on the outside the single-armed robot, and a small pattern may be mounted on the single-armed robot. when the first camera 181 is mounted on the outside the single-armed robot, the first camera 181 captures a small pattern mounted on the first robot 171 while moving a position thereof under the control of the processor 130, and may transmit the captured image to the processor 130. The single-armed robot mounted with a small pattern may be mounted with an end effector. Herein, a robot having a camera mounted thereto may be referred to as a "camera robot".

Although FIG. 1 illustrates three robots and three cameras by way of example, the number (N) of robots and cameras may be greater than three or less than three.

Figure 2:
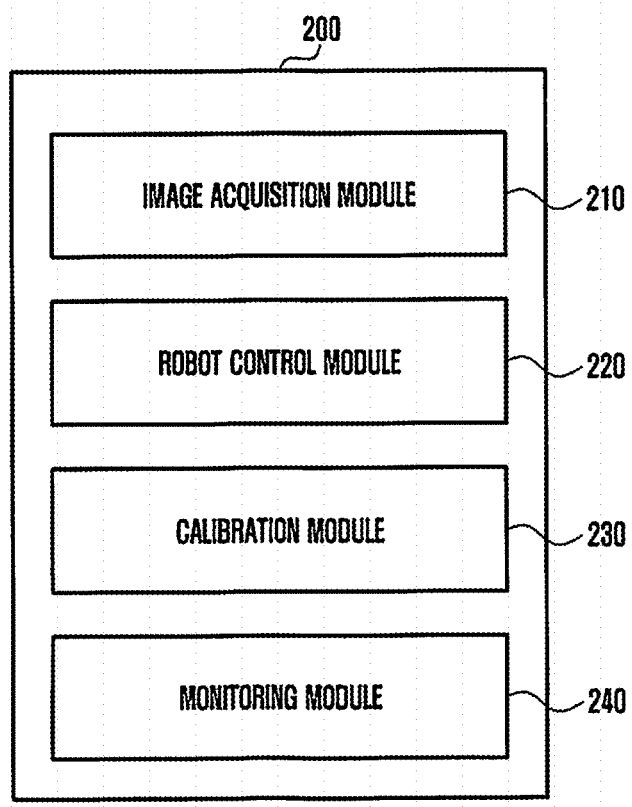
FIG. 2 illustrates a function processing module of a hand-eye calibration system according to an embodiment.

FIG. 2 illustrates a function processing module of a hand-eye calibration system according to an embodiment.

Referring to FIG. 2, the function processing module 200, which may be included, as a hardware module or a software module, in a processor including a processing circuit, includes an image acquisition module 210, a robot control module 220, a calibration module 230, and a monitoring module 240.

The image acquisition module 210 may acquire an image (or frame) from a camera included in (or connected to) the hand-eye calibration system. The camera may be installed to correspond to a small pattern robot (or a pattern robot). One or more cameras may be installed in one small pattern robot. The image acquisition module 210 may acquire an image according to the movement of the small pattern robot. The image acquisition module 210 may repeatedly acquire an image in response to the movement of the small pattern robot.

An image acquisition module 210 may acquire an angle of a camera (or a position of a camera) at the acquisition of image. The image acquisition module 210 may acquire multiple images captured at a first position according to the movement of a small pattern robot, and acquire multiple images captured at a second position according to the movement of the small pattern robot. The image acquisition module 210 may acquire multiple images at each position from a camera, the position of which has been moved a predetermined number of times. The image acquisition module 210 may transmit the acquired image (or multiple images) to the calibration module 230 or store the acquire image in a memory. When multiple cameras are installed, the image acquisition module 210 may store the image based on a camera identifier of the camera from which the image has been transmitted.

The robot control module 220 may control a small pattern robot included in (or connected to) the hand-eye calibration system. The robot control module 220 may control at least one of a position, a direction, and a moving pattern of the small pattern robot. The robot control module 220 may move the small pattern robot on the X-axis or Y-axis plane. The small pattern robot may be mounted with an end effector, and may be mounted with a small pattern for hand-eye calibration. The robot control module 220 may move the small pattern robot based on a traveling direction within the checkerboard stored in the memory. The checkerboard may be larger than a matrix of the small pattern. For example, a (1×1) size within the checkerboard may be the same as the size of the small pattern. For example, when the small pattern is a 2×2 matrix, the robot control module 220 may control the movement of the small pattern robot to enable the small pattern robot to move to all positions within the checkerboard in a 10×10 matrix format. The robot control module 220 may transmit posture information (or coordinate information and position information) according to the movement of the small pattern robot to a calibration module 230. The robot control module 220 may repeatedly move the small pattern robot until the small pattern robot moves to all of the positions within the checkerboard, and may transmit posture information changed according to the movement operation to the calibration module 230.

The calibration module 230 (or the hand-eye calibration module) may perform hand-eye calibration using the image acquired from the image acquisition module 210 and the posture information acquired from the robot control module 220. When the monitoring module 240 detects a malfunction, the calibration module 230 may perform hand-eye calibration using the image acquired from the image acquisition module 210 and the posture information acquired from the robot control module 220.

The calibration module 230 may perform hand-eye calibration using multiple images and multiple pieces of posture information. The multiple images may include a first image obtained by photographing the first robot 171 by the first camera 181, a second image obtained by photographing the first robot 171 which is moved once along the X-axis, and a third image obtained by photographing the first robot 171 which is moved twice along the X-axis. The multiple pieces of posture information includes information on first position (e.g., current position before moving) of the first robot 171, information on a second position of the first robot 171 which is moved once along the X-axis, and information on a third position (for example, a position in which the first robot is moved twice along the X-axis) of the first robot 171 which is moved once along the X-axis from a second position. The multiple images may include an image obtained by moving the first robot 171 along the Y-axis, and the multiple pieces of posture information may include posture information acquired while moving the first robot 171 along the Y-axis. In addition, the multiple images may include an image obtained by photographing the first robot 171 while moving the position of the camera.

The hand-eye calibration may be obtained by matching coordinate (or a coordinate value) information (or position information) of a small pattern of a small pattern robot to coordinate information in the checkerboard by associating the camera (or a camera robot) and the small pattern robot with each other. For example, the hand-eye calibration may be obtained by matching (or corresponding) position formation where a small pattern in the acquired image is located to position information where a small pattern within the checkerboard is located. An angle or direction in which a robot is photographed may differ according to a position on which the camera is mounted. Alternatively, since a focal length, an angle of view, and brightness may differ according to a camera, even if the same subject is photographed, in the case where different cameras are used, a position and a direction of the subject in the image may differ. The calibration module 230 may determine (or predict) a correspondence relationship (or a regional relationship) between the camera and the robot by using multiple images and multiple pieces of posture information. The calibration module 230 may set-up a camera and a small pattern robot based on the correspondence relationship. Thereafter, whether a malfunction occurs in a small pattern robot may be determined using an image captured by a camera. When receiving, from the monitoring module 240, the malfunction of the small pattern robot, the calibration module 230 may perform hand-eye calibration by using an image acquired from the image acquisition module 210 and posture information acquired from the robot control module 220.

The monitoring module 240 may monitor a small pattern robot. When the calibration is completed, operation information (e.g., a position or direction) of the small pattern robot may be determined based on the calibration. For example, the small pattern robot may move on a plane in the checkerboard according to operation information. When a malfunction occurs in the small pattern robot, the small pattern robot may not move to a predetermined position within the checkerboard. The monitoring module 240 may periodically or selectively monitor whether the small pattern robot normally operates after performing the calibration. The monitoring module 240 may periodically or selectively acquire an image from the image acquisition module 210, and may determine whether the small pattern in the acquired image is located at a predetermined position. The monitoring module 240 may diagnose a robot fault by using a difference between first pattern coordinate system information obtained by using small pattern position information in an image and posture information of a robot and second pattern coordinate system information obtained by mathematical equation using the joint angle of the robot. When a difference between the first pattern coordinate system information and the second pattern coordinate system information exceeds a predetermined threshold value, the monitoring module 240 may determine that the small pattern robot is malfunctioning (or has a fault). The monitoring module 240 may transmit an indication of whether the small pattern robot is malfunctioning to the calibration module 230.

According to an embodiment, a hand-eye calibration system may include a robot mounted with a small pattern; a camera configured to photograph the robot; a memory; and a processor. The processor may be configured to move the robot; acquire posture information of the moved robot; acquire an image from the camera; and move the robot after performing the robot movement, the posture information acquisition, and the image acquisition by a predetermined number of times. Hand-eye calibration for the robot is performed based on the posture information and the image, which are obtained by repeating the robot movement, the posture information acquisition, and the image acquisition.

The robot may be a two-armed robot, and may be configured such that a small pattern may be mounted on one arm of the two-armed robot, and a camera may be mounted on the other arm of the two-armed robot.

The memory may store a traveling direction within the checkerboard, and the processor may be configured to move the robot on a plane based on the traveling direction.

The processor may be configured to perform hand-eye calibration such that coordinate information of a small pattern included in the acquired image and coordinate information in the checkerboard correspond to each other.

The processor may be configured to move the robot in X-axis units or Y-axis units based on the traveling direction.

The small pattern mounted on the robot may be configured in the form of a smaller checkerboard than the checkerboard.

The processor may be configured to initialize positions of the robot and the camera after performing the robot movement, the posture information acquisition, and the image acquisition by a predetermined number of times.

The processor may be configured to, after the initialization, determine whether a position of the camera is required to be moved; move the camera on the basis of a result of the determination; and perform the robot movement, the posture information acquisition, and the image acquisition by a predetermined number of times.

The processor may be configured to determine whether the position of the camera has been moved less than a predetermined number of times, and determine that the position of the camera is required to be moved when the camera has been moved less than a predetermined number of times.

The processor may be configured to monitor the robot after performing the hand-eye calibration, and diagnose a fault of the robot based on a result of the monitoring.

The processor may be configured to acquire first pattern coordinate system information based on a pattern position in an image acquired from the camera; acquire second pattern coordinate system information obtained by robot kinematics; and diagnose a fault of the robot based on the first pattern coordinate system information and the second pattern coordinate system information.

The processor may be configured to identify whether a difference between the first pattern coordinate system information and the second pattern coordinate system information is smaller than a threshold value; determine that the robot operates normally when the difference is smaller than the threshold value; and determine that the robot does not operate normally when the difference is greater than or equal to the threshold value.

The processor may be configured to re-perform the hand-eye calibration when the robot is diagnosed as having a fault.

Figure 3A:
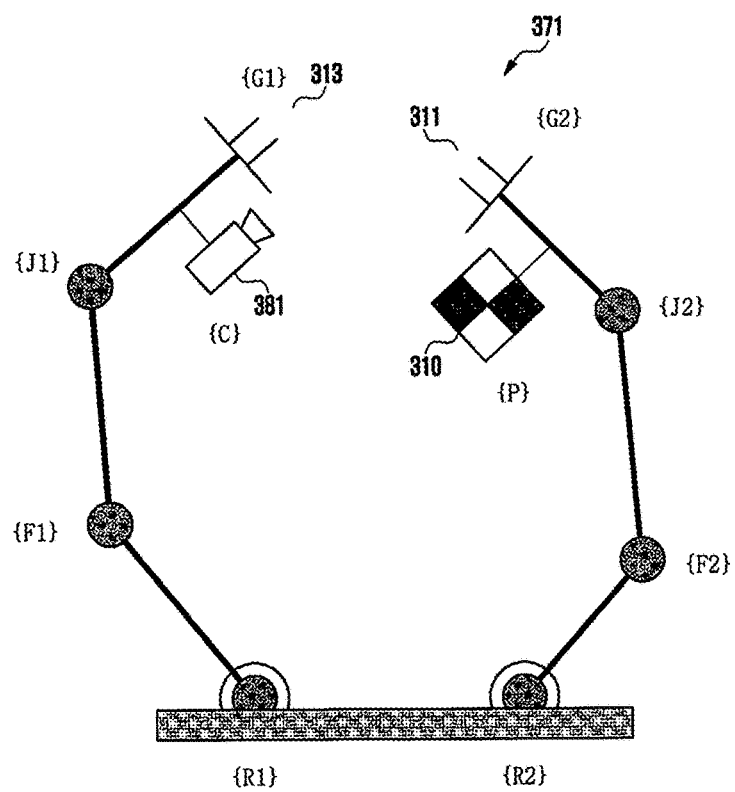
FIG. 3A illustrates a robot according to an embodiment.

FIG. 3A illustrates a robot according to an embodiment. Specifically, FIG. 3A illustrates calibration of a two-armed robot.

Referring to FIG. 3A, a hand-eye calibration system may perform calibration of a two-armed robot 371. A camera 181 is mounted on one arm of the two-armed robot 371, and a small pattern 310 is mounted on the other arm. An end effector 311 is mounted on the robot 371. In addition, an end effector 313 is mounted on the camera 381. The camera 381 may photograph the robot 371 (e.g., a robot on which a small pattern is mounted). The camera 381 may be configured to photograph the robot 371.

A processor of the hand-eye calibration system may move the robot s71 on a plane, and acquire an image obtained by capturing the robot 371 using the camera 381. The processor may perform hand-eye calibration of the two-armed robot 371 by using the acquired image and posture information (or position information) of a small pattern robot.

The processor may obtain a correlation between R1, F1, J1, G1, and C (e.g., the camera 381) based on the acquired image, and acquire position information (or posture information) of the camera 381 by using the correlation. The processor may obtain a first correlation for the position (or angle) between R1 and F1 based on the position of a small pattern in the image, a second correlation for the position (or angle) between J1 and G1, a third correlation for the position (or angle) between G1 and C. The processor may obtain a correlation for the position (or angle) between R1, F1, J1, G1, and C based on the first correlation, the second correlation, or the third correlation. The processor may obtain a correlation (e.g., R2 and F2, J2 and G2, G2 and P) between R2, F2, J2, G2, and P (e.g., the small pattern 310) based on the acquired image, and may acquire posture information of the robot 371 by using the correlation. The processor may perform hand-eye calibration of the two-armed robot 371 by matching position information of the camera 381 and posture information of the robot 371 to each other.

The processor may acquire posture information and an image while moving the robot 371 to all of the positions within the checkerboard at a first position of the camera 381, and then may acquire posture information and an image by moving the camera 381 to a second position. The processor may acquire posture information and an image while moving a position (or angle) of the camera 381 by a predetermined number of times, and may match the position information of the camera 381 and the posture information of the robot 371 to each other by using the acquired posture information and image, in order to perform hand-eye calibration of the two-armed robot 371. The hand-eye calibration may be obtained by matching (or corresponding) coordinate information of a small pattern of the robot 371 to coordinate information in the checkerboard to each other.

Figure 3B:
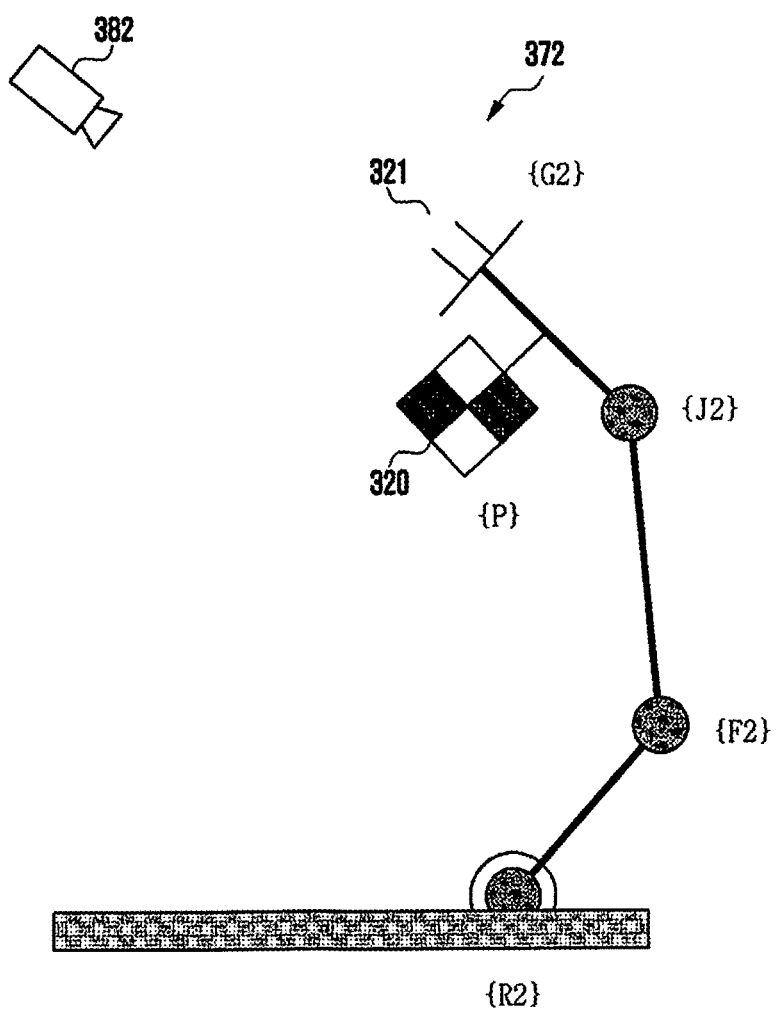
FIG. 3B illustrates a robot according to an embodiment.

FIG. 3B illustrates a robot according to an embodiment. FIG. 3B illustrates an example of calibration of a single-armed robot.

Referring to FIG. 3B, the hand-eye calibration system may perform calibration of a single-armed robot 372. A small pattern 320 is mounted on the single-armed robot 372, and a camera 382 is mounted apart from the single-armed robot 372. The camera 382 may be mounted so as to photograph a small pattern 310 mounted on the robot 372. An end effector 321 may be mounted on the robot 372.

A processor of the hand-eye calibration system may move the robot 372 on a plane, and may acquire an image of the single-armed robot 372 photographed using the second camera 382. The processor may perform hand-eye calibration of the robot 372 by using the acquired image and posture information (or coordinate information) of the robot 372. The processor may receive an input of position information of the camera 382 from a manager (or a user). The processor may obtain a correlation between R2, F2, J2, and G2 based on the acquired image, and may acquire posture information of the robot 372 by using the correlation.

The processor may acquire posture information and an image while moving the camera 372 to all of the positions within the checkerboard, and then may acquire posture information and an image while moving the robot 372 to all of the positions within the checkerboard by moving the camera 382 to another position (e.g., a second position). The processor may acquire posture information and an image while moving the position (or angle) of the camera 382 a predetermined number of times, and may perform hand-eye calibration of the robot 372 by matching the position information of the camera 382 and the posture information of the robot 372 to each other using the acquired posture information and image.

Figure 4:
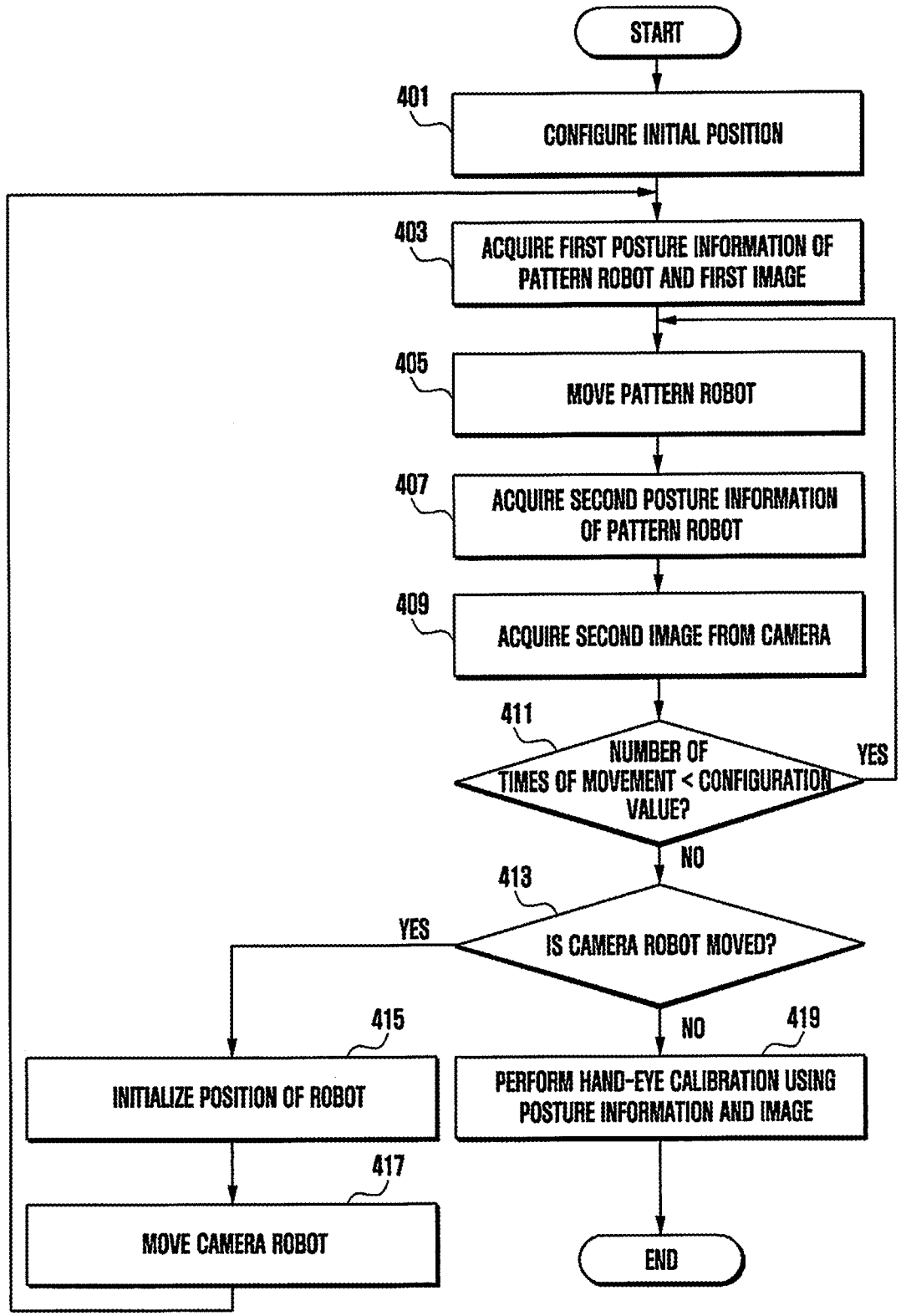
FIG. 4 is a flowchart illustrating a method for operating a hand-eye calibration system according to an embodiment.

FIG. 4 is a flowchart illustrating a method for operating a hand-eye calibration system according to an embodiment.

Referring to FIG. 4, in step 401, a processor of a hand-eye calibration system configures an initial position. The processor may configure the position of a pattern robot (or a small pattern robot) and a camera robot based on a robot task. For example, the processor may move the small pattern robot and the camera to a designated position (e.g., an initial position) in order to perform hand-eye calibration.

In step 403, the processor acquires first posture information (or position information) of a small pattern robot and a first image. The small pattern robot may be a two-armed robot or a single-armed robot. For a two-armed robot, a camera may be mounted on one arm of the robot (e.g., a camera robot), and a small pattern may be mounted on the other arm (e.g., a small pattern robot). For a single-armed robot, a small pattern may be mounted on the single-armed robot, and a camera may be mounted apart from the single-armed robot. A small pattern-mounted robot may be mounted with an end effector. When the camera is mounted outside the single-armed robot, the processor may acquire position information of a camera from the user.

The processor may, before moving a small pattern robot in the checkerboard, acquire first posture information of a small pattern robot, and may acquire, from a camera robot, a first image obtained by capturing a small pattern of the small pattern robot. The first posture information and the first image may be initial information. The first posture information may indicate a position of a small pattern. When the small pattern is configured in a 2×2 matrix, the processor may acquire, as first posture information, one point in the matrix. For example, the 2×2 matrix may include nine points, and the processor may acquire a center point of the 2×2 matrix as first posture information.

In step 405, the processor moves a small pattern robot. The processor may move the small pattern robot based on a traveling direction within the checkerboard. The traveling direction within the checkerboard may be pre-stored in a memory of the hand-eye calibration system. The processor may move a small pattern robot by 1 in an X-axis unit length based on the traveling direction. Alternatively, the processor may move the small pattern robot by 1 in a Y-axis unit length based on the traveling direction. The processor may count the number of movements of the small pattern robot after moving the small pattern robot. For example, the processor may count each movement as one each time step 405 is performed. The number of movements may be accumulated each time step 405 is performed.

In step 407, the processor acquires second posture information of the small pattern robot. The processor may acquire second posture information after moving a predetermined distance from the first posture information.

In step 409, the processor acquires a second image from the camera. The processor may acquire, from the camera, a second image obtained by capturing the small pattern robot after movement of the small pattern robot.

In step 411, the processor determines whether the number of movements of the small pattern robot is less than a configuration value. The processor may determine whether the number of movements, counted after step 405 is performed, exceeds a configuration value. The configuration value may be determined as a value capable of obtaining the minimum information required to perform hand-eye calibration. The configuration value may be preconfigured and stored in the memory.

When the number of movements is less than the configuration value, the method returns to step 405. When the method returns to step 405, processor repeats moving a small pattern robot in step 405, acquiring posture information in step 407, and acquiring an image in step 409. Basically, the processor repeats steps 405 to 411 until the number of movements is greater than or equal to the configuration value in step 411.

When the number of movement is greater than or equal to the configuration value in step 411, the processor determines whether a camera robot is to be moved in step 413. For more accurate and precise hand-eye calibration, the processor may use images captured at various angles. When the number of movements is greater than or equal to a configuration value may refer when a small pattern robot is moved to all of the positions within the checkerboard. When the small pattern robot has moved to all the positions within the checkerboard, the processor may move the camera robot. The processor may count the number of movements of the camera robot each time the camera robot is moved, and determine that the camera robot is not to be moved if the number of counted camera movements exceeds a predetermined number of times (e.g., "M"). When the number of counted camera movements is less than a predetermined number of times, the processor determine that the camera robot is to be moved in step 413. The greater the predetermined number of times, the higher the accuracy of hand-eye calibration. The predetermined number of times may be configured by a user or may be determined by the configuration of the hand-eye calibration.

If the camera robot is to be moved in step 413, the processor initializes the robot position in step 415. The processor may initialize the position of the small pattern robot and the camera robot. In step 413, the position of the small pattern robot may be at a terminating position (e.g., a terminal) within the checkerboard. The processor may initialize the position of the small pattern robot and the camera robot. The initialization location may be the same as the initial position in step 401.

In step 417, the processor moves the camera robot. The processor may move the camera robot to a position different from a position (or an angle) in step 403. For example, after step 403, while the camera robot is in a first position, when re-performing in step 403, the processor may move a position of the camera robot so that the camera robot is placed at a second position different from the first position. The method returns to step 403 after moving the position of the camera robot.

If the camera robot is not to be moved in step 413, the processor performs hand-eye calibration using posture information and an image in step 419. For example, when the configuration value is 12 and the predetermined number of times is 10, the processor may perform steps 403 to 409 in order to acquire 130 pieces of posture information and an image. The processor may match coordinate information of a small pattern of the small pattern robot to coordinate information in the checkerboard by associating the camera robot and the small pattern robot with each other based on the 130 pieces of posture information and the image. The hand-eye calibration may be obtained by matching position information in which a small pattern in the acquired image is located and position information in which a small pattern in the checkerboard is located.

Figure 5:
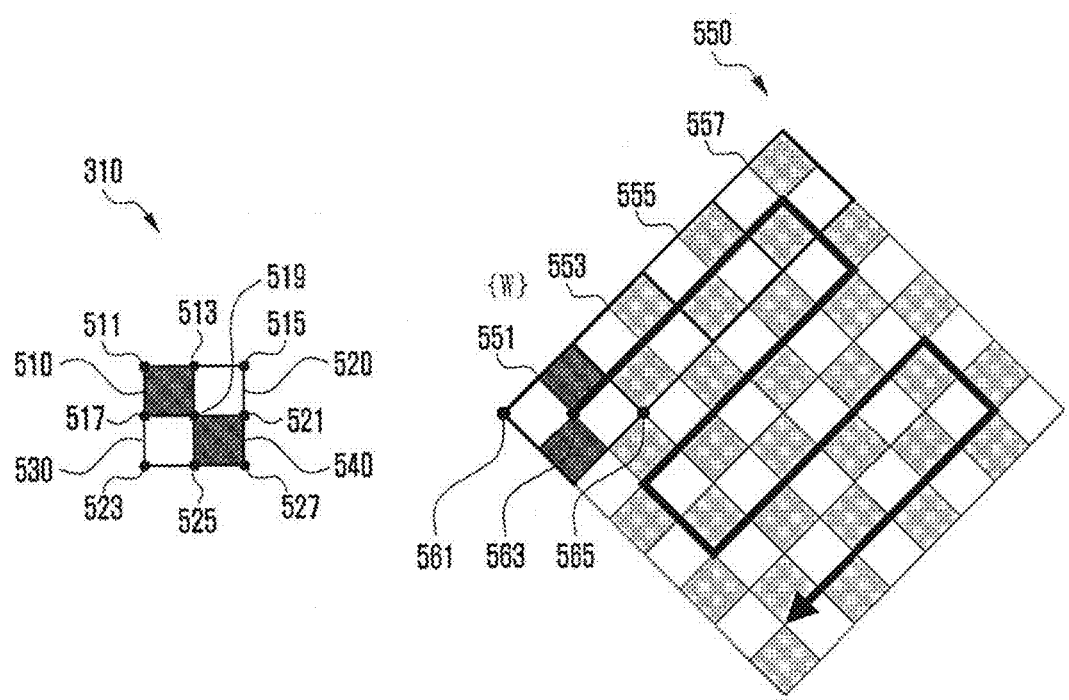
FIG. 5 illustrates a checkerboard configuration in response to movement of a robot according to an embodiment.

FIG. 5 illustrates a checkerboard configuration in response to movement of a robot according to an embodiment.

Referring to FIG. 5, a small pattern 310 may be mounted on a robot. The small pattern 310 may be configured in a matrix format including multiple squares. For example, the small pattern 310 includes a first square 510, a second square 520, a third square 530, and a fourth square 540 configured in a 2×2 matrix format. When represented by coordinates, the first square 510 may be represented by (1,1), the second square 520 may be represented by (1,2), the third square 530 may be represented by (2,1), and the fourth square 540 may be represented by (2,2). In the small pattern 310, the first square 510 and the second square 520, and the third square 530 and the fourth square 540, which are included in the same row, may be configured in different colors respectively. In addition, the first square 510 and the third square 530, and the second square 520 and the fourth square 540, which are included in the same column in the small pattern 310, may be configured in different colors respectively. In the small pattern 310, the first square 510 and the fourth square 540, and the second square 520 and the third square 530, which are diagonally opposite each other, may be configured in the same color. For example, the first square 510 and the fourth square 540 are configured in a bright color (e.g., white), and the second square 520 and the third square 530 are configured in a dark color (e.g., black).

A processor of the hand-eye calibration system may configure, based on a small pattern, a checkerboard 550 including a matrix larger than the small pattern. For example, a (1×1) size in the checkerboard 550 may be the same size as the small pattern 310. When the small pattern 310 is a 2×2 matrix, the checkerboard 550 may include a 4×4 matrix format. The processor 130 may move a robot mounted with the small pattern 310 once based on a traveling direction (for example, the bold arrow in FIG. 5) in the checkerboard 550 in order to move the small pattern 310 to a second position 553 from a first position 551. Further, the processor may move the small pattern 310 from the second position 553 to a third position 555 by moving a robot mounted with the small pattern 310, and move the small pattern 310 from the third position 555 to a fourth position 557. When the small pattern 310 is in the first position 551, the processor 130 may acquire first posture information of the small pattern robot, acquire a first image obtained by capturing the small pattern robot, and when the small pattern 310 is moved to the second position 553, the processor 130 may acquire second posture information of the small pattern robot, and may acquire a second image obtained by capturing the small pattern robot.

The processor may acquire posture information and an image of a small pattern robot at all positions within the checkerboard 550. If the processor acquires posture information of the small pattern robot and an image thereof at all positions within the checkerboard 550, the processor may move a position of a camera robot to acquire posture information and an image of the small pattern robot at different angles. The processor may perform hand-eye calibration such that a position of a small pattern 310 of the small pattern robot corresponds to a position of the small pattern within the checkerboard 550, using multiple pieces of posture information and multiple images acquired while moving the position of the small pattern robot and the camera robot.

The hand-eye calibration may be obtained such that any one of nine points in the small pattern 310 is matched to one point in the checkerboard 550. For example, the processor may match, to a second point 563 within the checkerboard 550, a fifth point 519 among a first point 511, a second point 513, a third point 515, a fourth point 517, a fifth point 519, a sixth point 521, a seventh point 523, an eighth point 525, and a ninth point 527 in the small pattern 310. Alternatively, the processor may match the first point 511 in the small pattern 310 to a first point 561 within the checkerboard 550. Alternatively, the processor may match the ninth point 527 in the small pattern 310 to a third point 565 within the checkerboard 550.

The processor may perform hand-eye calibration in order to determine a position in which the small pattern 310 of the small pattern robot should be positioned within the checkerboard 550 over time. Thereafter, the processor may determine whether the small pattern robot operates normally, by periodically or selectively monitoring the position of the small pattern robot. If it is determined that the small pattern robot does not operate normally, the processor may perform a calibration operation.

Figure 6A:
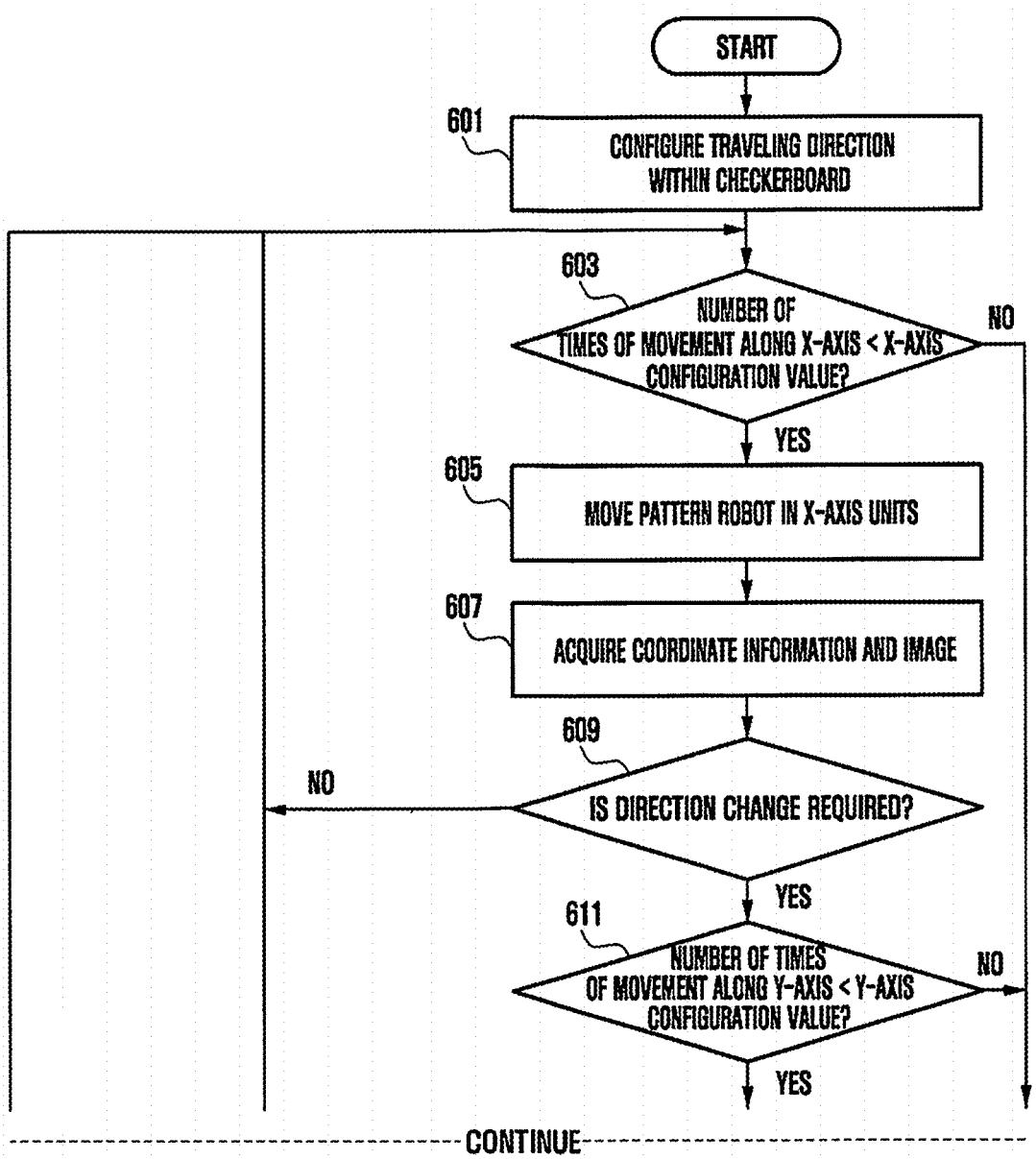
FIGS. 6A and 6B are flowcharts illustrating a calibration method of a hand-eye calibration system according to an embodiment.
Figure 6B:
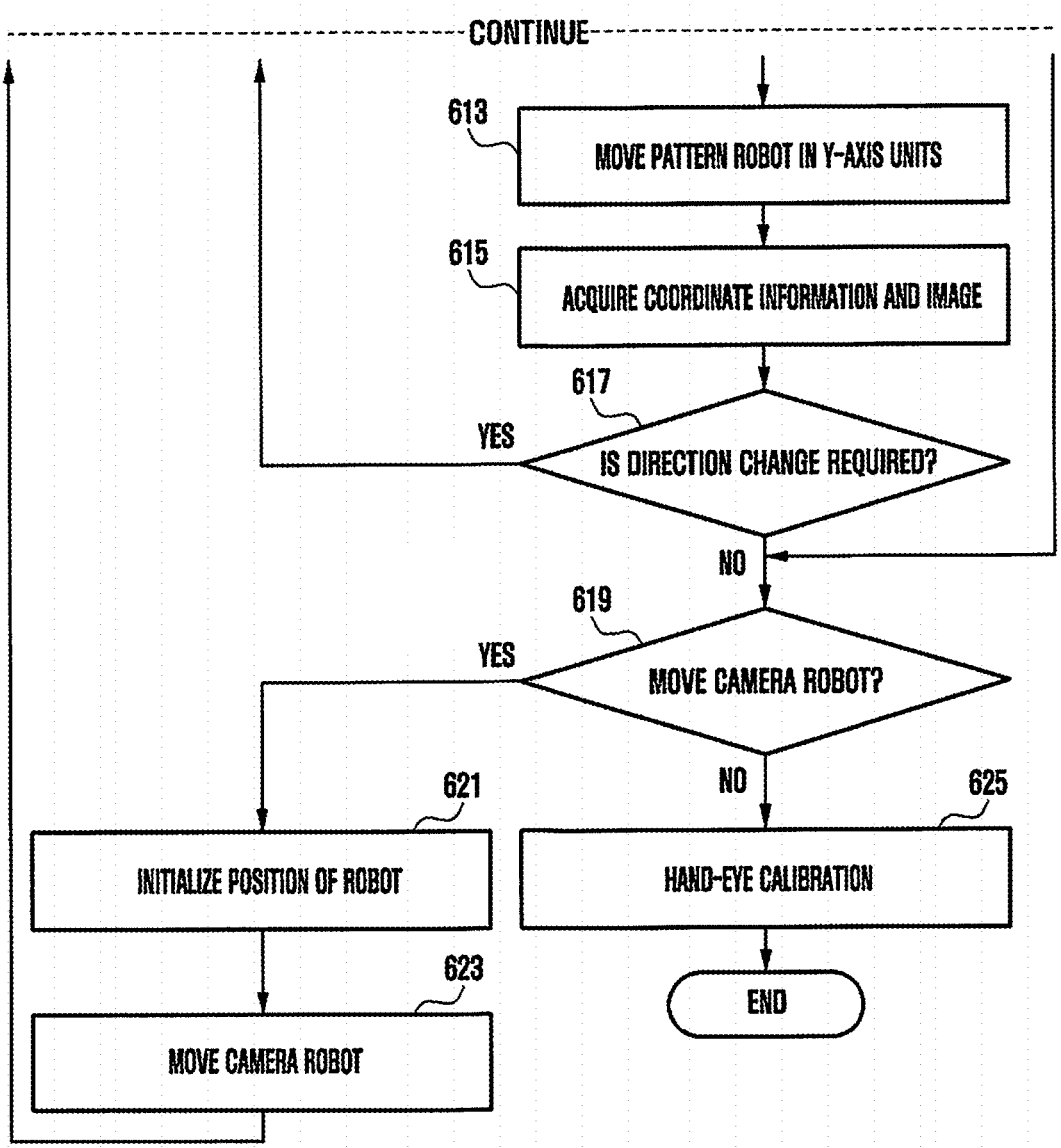

FIGS. 6A and 6B are a flowcharts illustrating a calibration method of a hand-eye calibration system according to an embodiment.

Referring to FIGS. 6A and 6B, in step 601, a processor of a hand-eye calibration system configures a traveling direction within a checkerboard. When a robot calibration is performed, the processor may preconfigure a position (or a direction) to which a robot having a small pattern mounted thereon should move. Since calibration utilizes a robot having a small pattern mounted thereon to move to all of the positions within the checkerboard, the traveling direction may or may not coincide with an actual operating direction of the robot. The traveling direction may be stored in a memory of the hand-eye calibration system.

The processor may acquire initial information after a two-armed robot is setup. For example, the processor may acquire posture information (e.g., first posture information) of a small pattern robot, and acquire an image (e.g., a first image) of the small pattern robot captured by a first camera. The first posture information and the first image may be initial information, and may correspond to the first position 551 on the checkerboard 550 in FIG. 5.

In step 603, the processor determines whether the number of X-axis movements is less than an X-axis configuration value. The X-axis configuration value (e.g., "n") may be configured based on a minimum number of movements required for calibration. For example, the X-axis configuration value may be preconfigured in the hand-eye calibration system or input by a manager of the hand-eye calibration system. The X-axis configuration value may be stored in a memory. When the number of X-axis movements is less than the X-axis configuration value, the processor perform step 605. However, when the number of X-axis movements is greater than or equal to the X-axis configuration value, the processor performs step 619.

In step 605, the processor moves a small pattern robot in X-axis units based on the traveling direction within the checkerboard. The small pattern robot may move on a plane (e.g., a two-dimensional movement), and may first move in X-axis units. Although FIG. 5 illustrates movement in X-axis units first, an operation of movement by Y-axis units may be performed first instead. For example, a small pattern robot on which the small pattern 310 is mounted may move by 1 in X-axis units under the control of the processor and move to a second position 553 in the checkerboard 550 in FIG. 5. The movement in X-axis units may refer to moving one space in the left direction or the right direction. Whether to move left direction or right direction may be based on the traveling direction. The processor may count the number of movements along the X-axis after moving the small pattern robot. The number of movements along the X-axis may be counted as the small pattern robot is moved according to step 605. The processor may accumulate the number of movements along the X-axis each time step 605 is performed.

In step 607, the processor acquires coordinate information (or posture information) and an image. The processor may acquire coordinate information (e.g., (1,0)) that changes according to the movement of the small pattern robot. The processor may acquire, as coordinate information, a correlation between R2, F2, J2, G2, and P (e.g., a small pattern) as illustrated in FIG. 3B. The processor may acquire, from a camera robot, an image of a small pattern robot captured by the camera robot.

In step 609, the processor determines whether a direction change is required. The processor may determine whether the direction change is required based on a traveling direction within the checkerboard. The direction change may refer to a change from the X-axis direction to the Y-axis direction. The processor may perform step 613 when the direction change is required, and re-performs step 603 when the direction change is not required. Returning to step 603, the processor repeats steps 603 to 607.

When a direction change is required in step 609, the processor determines whether the number of movements along the Y-axis is less than an Y-axis configuration value in step 611. The Y-axis configuration value may be configured based on the minimum number of times of movement required for calibration. For example, the Y-axis configuration value (e.g., "m") may be preconfigured in the hand-eye calibration system or input by a manager of the hand-eye calibration system. The Y-axis configuration value may be stored in a memory. When the number of movements along the Y-axis is less than the Y-axis configuration value, the processor perform step 613. When the number of movements along the Y-axis is greater than or equal to the Y-axis configuration value, the processor performs step 619. Step 611 is the same as or similar to step 603, and thus detailed description thereof is omitted.

In step 613, the processor moves the small pattern robot in Y-axis units. For example, a small pattern robot on which the small pattern 310 is mounted moves by 1 in Y-axis units under the control of the processor, and thus may move to a fifth position within the checkerboard 550, as illustrated in FIG. 5. Because step 613 is the same as or similar to step 605, detailed description thereof is omitted.

The processor 130 may move a small pattern robot and count the number of movements along the Y-axis. The number of movements along the Y-axis may be counted as the small pattern robot is moved according to step 613.

In step 615, the processor acquires coordinate information and an image. The processor may acquire coordinate information (e.g., (4,1)) that changes according to the movement of the small pattern robot. For example, the processor may acquire, as coordinate information, a correlation between R2, F2, J2, G2, and P (e.g., a small pattern), as illustrated in FIG. 3B. The processor may acquire, from the camera robot, an image of a small pattern robot captured by the camera robot. Step 615 is the same as or similar to step 607, and thus detailed description thereof is omitted.

In step 617, the processor determines whether a direction change is required. The processor may determine whether a direction change is required based on a traveling direction within the checkerboard. The direction change may refer to a change from the Y-axis direction to the X-axis direction. The processor re-performs step 603 when a direction change is required, and performs step 619 when no direction change is required.

If no direction change is required in step 617, the processor determines whether the camera robot is to be moved in step 619. The processor may acquire an image captured at various angles and coordinate information thereof, in order to perform more accurate hand-eye calibration. For example, a direction change is not required when the small pattern robot is moved to all of the positions within the checkerboard. When the small pattern robot is moved to all of the positions within the checkerboard, the processor may move the camera robot. The processor may count the number of movements of the camera robot each time the camera robot is moved, and if the counted number of movements is greater than or equal to a predetermined number of times (e.g., "M"), the processor may determine that the camera robot is not required to be moved, and may perform step 625. When the counted number of movements is les then the predetermined number of times, the processor may determine that the camera robot is required to be moved, and performs step 621.

When the camera robot is to be moved in step 619, the processor initializes a robot position in step 621. The processor may initialize the position of the small pattern robot and the camera robot. In step 619, the position of the small pattern robot may be at an end position (e.g., an end) within the checkerboard. The processor may initialize the position of the small pattern robot and the camera robot. The initialization position may be the same as an initial position in step 401 in FIG. 4 as described above.

In step 623, the processor moves the camera robot. The processor may move the camera robot to a position different from a position (or angle) in which the step 603 was performed. The processor may return to step 603 after moving the position of the camera robot.

If the camera robot is not to be moved in step 619, the processor performs hand-eye calibration in step 625. For example, the processor may acquire as much coordinate information as the X-axis configuration value, as much coordinate information as the Y-axis configuration value, and as many images as the summed total of the X-axis configuration value and the Y-axis configuration value. The processor may further acquire images corresponding to the number of camera movements, which include X-axis coordinate information of the X-axis configuration value, Y-axis coordinate information of the Y-axis configuration value, and the summed total of the X-axis configuration value and the Y-axis configuration value. The processor may associate a relationship between the small pattern robot and the camera robot based on multiple pieces of coordinate information and multiple images. The processor may perform a calibration for matching small pattern coordinate information (e.g., X and Y coordinate values) of the small pattern robot to coordinate information (e.g., X and Y coordinate values) in a checkerboard.

The processor may perform steps 603 to 623 "M" times, and may perform hand-eye calibration using a result of the performance (e.g., posture information and image). Since the accuracy of hand-eye calibration may differ between performing operations of FIGS. 6A and 6B one time or performing operations thereof 10 times, operations in FIGS. 6A and 6B may be performed one or more times according to the required accuracy level.

Figure 7:
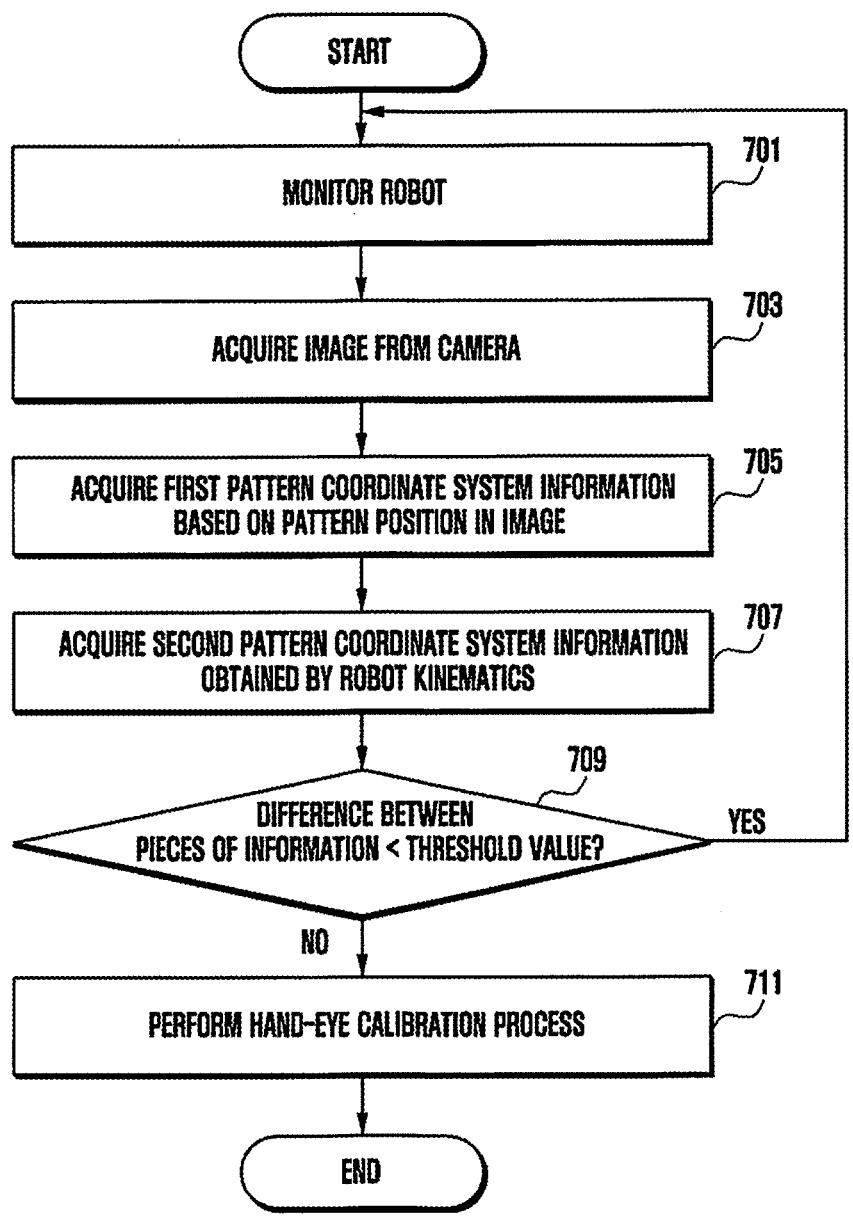
FIG. 7 is a flowchart illustrating a method for diagnosing a robot fault by a hand-eye calibration system according to an embodiment.

FIG. 7 is a flowchart illustrating a method for diagnosing a robot fault by a hand-eye calibration system according to an embodiment.

Referring to FIG. 7, in step 701, a processor of a hand-eye calibration system monitors a robot (e.g., a small pattern robot). The robot may perform calibration by mounting a small pattern thereon. The processor may periodically or selectively monitor whether the robot operates properly after performing calibration.

In step 703, the processor acquires an image from a camera (or camera robot). The image may be obtained by capturing a small pattern robot. The processor may determine whether the robot operates normally by identifying a position of a small pattern robot in an image.

In step 705, the processor acquires first pattern coordinate system information based on a position of a small pattern in the image. When hand-eye calibration is performed, a position of a small pattern of a robot and a position of the small pattern within the checkerboard may coincide with each other. The processor may obtain first pattern coordinate system information based on the position of the small pattern in the image.

In step 707, the processor acquires second pattern coordinate system information obtained by robot kinematics. The processor may obtain second pattern coordinate system information by substituting, into robot kinematic equations, parameter values corresponding to R1, F1, J1, G1, and C and parameter values corresponding to R2, F2, J2, G2, and P as illustrated in FIG. 3A.

In step 709, the processor determines whether a robot has a fault based on a difference between the first pattern coordinate system information and the second pattern coordinate system information. Specifically, the processor determines whether a difference between the first pattern coordinate system information and the second pattern coordinate system information is smaller than a threshold value. When the difference between the first pattern coordinate system information and the second pattern coordinate system information is smaller than a threshold value, the processor determines that a robot operates normally. That is, the processor may determine that the robot operates normally when a position of a small pattern in the image corresponds to a position of the small pattern within the checkerboard, based on the first pattern coordinate system information and the second pattern coordinate system information. However, when the difference between the first pattern coordinate system information and the second pattern coordinate system information is greater than or equal to the threshold value, the processor determines that the robot does not operate normally. The processor may determine that the robot does not operate normally when a position of a small pattern in the image does not correspond to a position of the small pattern within the checkerboard, based on the first pattern coordinate system information and the second pattern coordinate system information. The processor performs step 711 when it is determined that the robot has a fault, and re-performs step 701 when it is determined that the robot does not have a fault. The processor may diagnose whether the robot has a fault by periodically or selectively monitoring the robot in the case where the robot operates.

When the difference between the first pattern coordinate system information and the second pattern coordinate system information is greater than or equal to the threshold value, i.e., when it is determined that a robot has a fault, in step 709, the processor performs a hand-eye calibration process in step 711. The hand-eye calibration process may refer to the steps illustrated in FIG. 4 or FIGS. 6A and 6B.

The processor may temporarily stop operation of the robot and perform (or re-perform) the hand-eye calibration process. When the processor completes the hand-eye calibration process, the processor may operate the robot. The processor perform step 701 periodically or selectively upon completion of the hand-eye calibration process.

According to an embodiment, a method is provided for operating a hand-eye calibration system including a robot on which a small pattern is mounted and a camera configured to photograph the robot. The method includes moving the robot; acquiring posture information of the moved robot; acquiring an image from the camera; moving the camera after performing robot movement, the posture information acquisition, and the image acquisition by a predetermined number of times; and performing a hand-eye calibration for the robot based on the posture information and the image, which are obtained by repeating the robot movement, the posture information acquisition, and the image acquisition.

The robot may be a two-armed robot, the small pattern is mounted on one arm of the two-armed robot, the camera may be mounted on the other arm of the two-armed robot.

Moving the robot may include storing a traveling direction within a checkerboard in a memory of the hand-eye calibration system; and moving the robot in X-axis units or Y-axis units based on the traveling direction.

Performing the hand-eye calibration may include performing hand-eye calibration so that coordinate information of a small pattern included in the acquired image and coordinate information of the small pattern within the checkerboard correspond to each other.

The method may further include initializing the position of the robot and the camera after performing the robot movement, the posture information acquisition, and the image acquisition by a predetermined number of times, and determining whether a position of the camera is required to be moved after the initialization; moving the camera based on a result of the determination; and performing the robot movement, the posture information acquisition, and the image acquisition by a predetermined number of times.

The method may further include monitoring the robot after performing the hand-eye calibration; and diagnosing a fault of the robot on the basis of a result of the monitoring.

Diagnosing a fault of the robot may include obtaining first pattern coordinate system information based on a pattern position in the image acquired from the camera, obtaining second pattern coordinate system information obtained by robot kinematics; and diagnosing a fault of the robot based on the first pattern coordinate system information and the second pattern coordinate system information.

When a camera is mounted on one arm of a two-armed robot, a small pattern configured to have a smaller form than a checkerboard used for calibration may be mounted on the other arm, and hand-eye calibration can be performed while moving positions of the camera and the robot having the small pattern mounted thereon.

Hand-eye calibration can be performed by mounting on a robot a small pattern configured to have a smaller form than a checkerboard used for calibration, increasing user convenience by operating a robot with a small pattern mounted thereto.

Various embodiments disclosed herein and shown in the drawings are merely examples presented in order to easily describe technical details of the disclosure and to help the understanding of the disclosure, and are not intended to limit the scope of the disclosure. Therefore, it should be construed that, in addition to the embodiments disclosed herein, all modifications and changes or modified and changed forms derived from the technical idea of the disclosure fall within the scope of the disclosure.

While the disclosure has been particularly shown and described with reference to certain embodiments thereof, it will be understood by those skilled in the art that various changes in form and details may be made therein without departing from the scope of the disclosure as defined by the appended claims.

What is claimed is:

1. A hand-eye calibration system, comprising:
    a robot on which a small pattern is mounted;
    a camera configured to photograph the robot;
    a memory; and
    a processor configured to:
        move the robot,
        acquire posture information of the moved robot,
        acquire an image from the camera,
        move the camera after performing the robot movement, the posture information acquisition, and the image acquisition a first predetermined number of times, and
        perform hand-eye calibration for the robot based on the posture information and the images, which are obtained by repeatedly performing of the robot movement, the posture information acquisition, the image acquisition, and the camera movement.

2. The hand-eye calibration system of claim 1, wherein the robot includes two-arms, and
    wherein the small pattern is mounted on a first arm of the robot, and the camera is mounted on a second arm of the robot.

3. The hand-eye calibration system of claim 1, wherein the memory stores a traveling direction within a checkerboard, and
    wherein the processor is further configured to move the robot on a plane based on the traveling direction.

4. The hand-eye calibration system of claim 3, wherein the processor is further configured to perform the hand-eye calibration by matching first coordinate information of a small pattern included in the acquired image and second coordinate information of the small pattern in the checkerboard.

5. The hand-eye calibration system of claim 3, wherein the processor is further configured to move the robot in X-axis units or Y-axis units based on the traveling direction.

6. The hand-eye calibration system of claim 3, wherein the small pattern mounted on the robot is configured in a form of a smaller checkerboard than the checkerboard.

7. The hand-eye calibration system of claim 1, wherein the processor is further configured to initialize positions of the robot and the camera after performing the robot movement, the posture acquisition, the image acquisition the first predetermined number of times.

8. The hand-eye calibration system of claim 7, wherein the processor is further configured to:
    after the initialization, determine whether the position of the camera is to be moved;
    move the camera, in response to determining that the position of the camera is to be moved; and
    perform the robot movement, the posture information acquisition, and the image acquisition the first predetermined number of times.

9. The hand-eye calibration system of claim 8, wherein the processor is further configured to:
    determine whether the position of the camera has been moved less than a second predetermined number of times; and
    when the position of the camera has been moved less than the second predetermined number of times, determine that the position of the camera is to be moved.

10. The hand-eye calibration system of claim 1, wherein the processor is further configured to:
    monitor the robot after performing the hand-eye calibration; and
    diagnose a fault of the robot based on the monitoring.

11. The hand-eye calibration system of claim 10, wherein the processor is further configured to:
    acquire first pattern coordinate system information based on a pattern position within the image acquired from the camera;
    acquire second pattern coordinate system information obtained by robot kinematics; and
    diagnose a fault of the robot based on the first pattern coordinate system information and the second pattern coordinate system information.

12. The hand-eye calibration system of claim 11, wherein the processor is further configured to:
    identify whether a difference between the first pattern coordinate system information and the second pattern coordinate system information is smaller than a threshold value;
    determine that the robot operates normally when the difference is smaller than the threshold value; and
    determine that the robot does not operate normally when the difference is greater than or equal to the threshold value.

13. The hand-eye calibration system of claim 10, wherein when the robot is diagnosed as having the fault, the processor is further configured to re-execute the hand-eye calibration.

14. A method for operating a hand-eye calibration system including a robot on which a small pattern is mounted and a camera configured to photograph the robot, the method comprising:
  moving the robot;
  acquiring posture information of the moved robot;
  acquiring an image from the camera;
  moving the camera after performing the robot movement, the posture information acquisition, and the image acquisition a first predetermined number of times; and
  performing hand-eye calibration for the robot based on the posture information and the image, which are obtained by repeating the robot movement, the posture information acquisition, the image acquisition, and the camera movement.

15. The method of claim 14, wherein the robot includes two-arms, and
  wherein the small pattern is mounted on a first arm of the robot, and the camera is mounted on a second arm of the robot.

16. The method of claim 14, wherein moving the robot comprises:
  storing a traveling direction within a checkerboard in a memory of the hand-eye calibration system; and
  moving the robot in X-axis units or Y-axis units based on the traveling direction.

17. The method of claim 16, wherein performing the hand-eye calibration comprises:
  matching first coordinate information of a small pattern included in the acquired image and second coordinate information of the small pattern in the checkerboard.

18. The method of claim 14, further comprising:
  initializing positions of the robot and the camera after performing the robot movement, the posture information acquisition, and the image acquisition the first predetermined number of times;
  determining whether the position of the camera is to be moved after the initialization;
  moving the camera in response to determining that the position of the camera is to be moved; and
  performing the robot movement, the posture information acquisition, and the image acquisition the first predetermined number of times.

19. The method of claim 14, further comprising:
  monitoring the robot after performing the hand-eye calibration; and
  diagnosing a fault of the robot based on the monitoring.

20. The method of claim 19, wherein diagnosing the fault of the robot comprises:
  acquiring first pattern coordinate system information based on a pattern position in the image acquired from the camera;
  acquiring second pattern coordinate system information obtained by robot kinematics; and
  diagnosing the fault of the robot based on the first pattern coordinate system information and the second pattern coordinate system information.

* * * * *